N. E. GOLDBERG.
PLANCHETTE.
APPLICATION FILED JUNE 1, 1920.
1,366,174. Patented Jan. 18, 1921.
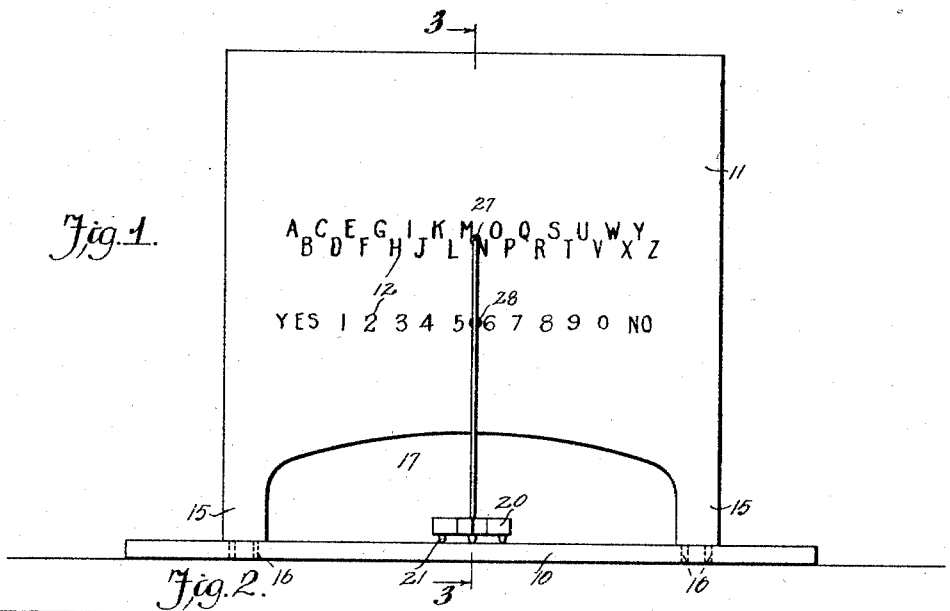
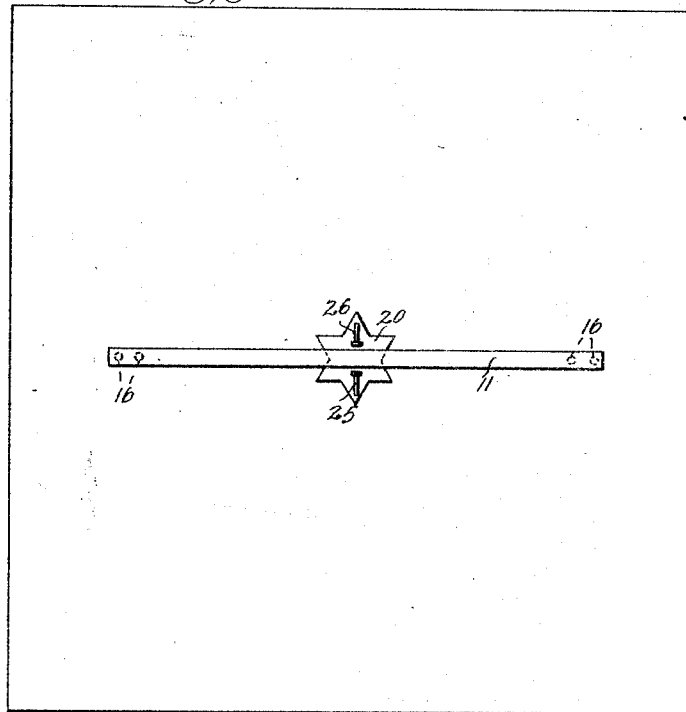
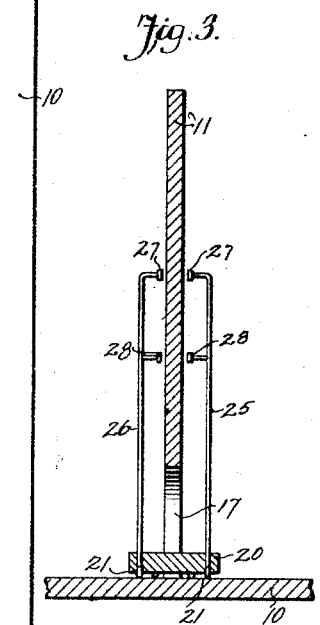
INVENTOR
NATHAN E. GOLDBERG

UNITED STATES PATENT OFFICE.

NATHAN E. GOLDBERG, OF NEW YORK, N. Y.

PLANCHETTE.

1,366,174.  Specification of Letters Patent.  Patented Jan. 18, 1921.

Application filed June 1, 1920. Serial No. 385,534.

*To all whom it may concern:*

Be it known that I, NATHAN E. GOLDBERG, a citizen of the United States, and a resident of the city of New York, borough of Manhattan, in the county and State of New York, have invented a new and Improved Planchette, of which the following is a full, clear, and exact description.

The invention relates to games and toys and its object is to provide a new and improved planchette arranged to enable two persons seated opposite each other to simultaneously manipulate a movable table without the persons being able to look at each other, thus heightening the effect when using the planchette for answering the questions.

Another object is to enable each of the persons using the planchette at the time to read the answer without one consulting with the other.

With these and other objects in view, the invention consists of certain novel features of construction, as hereinafter shown and described and specifically pointed out in the claims.

A practical embodiment of the invention is represented in the accompanying drawings forming a part of this specification, in which similar characters of reference indicate corresponding parts in all the views.

Figure 1 is a side elevation of the improved planchette;

Fig. 2 is a plan view of the same;

Fig. 3 is a cross section of the same; and

Fig. 4 is a face view of a portion of the reverse face of the board having the answering elements.

The planchette is mounted on a suitably constructed base 10 adapted to be placed on a table or other suitable support and on this base is erected a board 11 provided on its faces with sets of answering elements 12 and 13, of which the answering elements of one set are in register with the corresponding elements of the other set, as will be readily understood by reference to Figs. 1 and 4. The answering elements of each set consist preferably of the letters of the alphabet and the digits 1 to 0 flanked on one side by the word "Yes" and on the other side by the word "No," as plainly shown in Figs. 1 and 4. In practice the board 11 is provided with legs 15 having pins 16 engaging corresponding openings in the base 10 to hold the board 11 in vertical position on the base 10.

It will also be noticed that by the use of the legs 15 the board 11 is provided at its bottom with a cut-out portion 17 below the sets of answering elements 12 and 13.

On the base 10 is mounted a movable member in the form of a small table 20 having, preferably, the shape of a star and having small legs 21 mounted to travel on the upper surface of the base 10 on moving the table 20 about. The table 20 extends through the cut-out portion 17, and on the table are erected two pointers 25 and 26, of which the pointer 25 is adapted to indicate on the set of answering elements 12 while the other pointer 26 is adapted to indicate on the corresponding elements of the set of answering elements 13. The answering elements of the two sets of answering elements are preferably arranged in two rows, and the pointers 25, 26 are provided with corresponding points 27, 28 to point on the corresponding elements in the two rows. The letters of the alphabet of each upper row of answering elements 12 and 13 are preferably arranged in staggered relation, as plainly shown in Figs. 1 and 4, so that the point 27 of either pointer 25, 26 can readily point to a corresponding letter of the alphabet.

By the arrangement of the letters of the alphabet in the manner described it is not necessary to provide a board 11 of an exceedingly large width, thus rendering the planchette exceedingly compact. It will be noticed that the board 11 besides carrying the answering elements forms a partition between the two persons using the planchette at the time and seated at opposite sides of the planchette, and as the table 20 extends through the cut-out portion 17 of the board 11 the two persons can readily place their hands on the table 20 to move the same over the base 10 in the usual manner, and without the persons being able to look at each other, thus heightening the effect in using the planchette. As the points 27 and 28 of the pointers 25 and 26 indicate on the same answering elements of the two sets of answering elements at the time, it is evident that both persons read the answer alike.

When the planchette is not in use, the board 11 can be readily detached from the base 10 to permit of conveniently folding the planchette for storage or transporting purposes.

Having thus described my invention, I claim as new and desire to secure by Letters Patent:—

1. A planchette, comprising a base, an upright board on the said base and provided with answering elements, the said board providing a space between its lower edge and the top of the base, and the said board forming a partition between the players located at opposite sides of the board, and a table movable over the said base within the said space, the table having indicating means adapted to indicate on the said answering elements.

2. A planchette, comprising a base, a board mounted vertically thereon and provided on its faces with corresponding and registering answering elements, the board having a cut-out portion at its bottom edge below the answering elements, a table movable on the said base and extending through the said cut-out portion, and pointers held on the said table and adapted to indicate on registering answering elements on the faces of the said board.

3. A planchette, comprising a base, a board mounted vertically thereon and provided on its faces with corresponding and registering answering elements, the board having a cut-out portion at its bottom edge below the answering elements, a table having legs resting on the said base to support the table above the base, the table extending through the said cut-out board portion, and two pointers erected on the said table and adapted to indicate simultaneously on corresponding answering elements on the faces of the board.

NATHAN E. GOLDBERG.